United States Patent [19]

Petsche

[11] 4,214,518
[45] Jul. 29, 1980

[54] MEAT TUMBLER

[75] Inventor: Lee E. Petsche, Hickory Hills, Ill.

[73] Assignee: Foldenauer Equipment Co., Inc., Bridgeview, Ill.

[21] Appl. No.: 613,056

[22] Filed: Sep. 15, 1975

[51] Int. Cl.² .................... E05C 19/18; B26D 3/08
[52] U.S. Cl. ................................ 99/535; 292/260; 83/867
[58] Field of Search .................. 99/485, 516, 535; 259/3, 15, 31, 82; 51/164; 241/172, 181, 183; 17/25; 426/518, 519; 69/30, 65; 220/345-346, 351; 292/260, DIG. 46; 49/40-41, 501; 68/139; 88/11, 12

[56] References Cited

U.S. PATENT DOCUMENTS

| 684,923 | 10/1901 | Draper | 292/260 |
|---|---|---|---|
| 1,273,662 | 7/1918 | Petrie | 69/30 |
| 1,507,577 | 9/1924 | Browne | 99/535 |
| 2,457,927 | 1/1949 | Scudder | 292/260 |
| 4,029,824 | 6/1977 | Langen | 426/519 |

FOREIGN PATENT DOCUMENTS 1232905  5/1971  United Kingdom ................ 17/25

Primary Examiner—Harvey C. Hornsby
Assistant Examiner—Timothy F. Simone
Attorney, Agent, or Firm—Olson, Trexler, Wolters, Bushnell & Fosse, Ltd.

[57] ABSTRACT

Apparatus for treating meat comprises introducing pieces of meat into a tumbling drum rotatable about a horizontal axis and which contains circumferentially spaced rods on the inside of the drum adjacent to its periphery and parallel to the axis of rotation. The rods contain teeth so that upon rotation of the drum the meat is tumbled causing the teeth to produce a mass of small cuts in the surface of the meat. The drum is sealed by a watertight door that is readily opened and closed, as needed. The tumbling process takes approximately 20 minutes. The tumbling in combination with the formation of small cuts in the surface of the meat increases the exposure of myosin protein at the meat surface and also improves color uniformity and dispersion of pickling solution in the meat.

9 Claims, 9 Drawing Figures

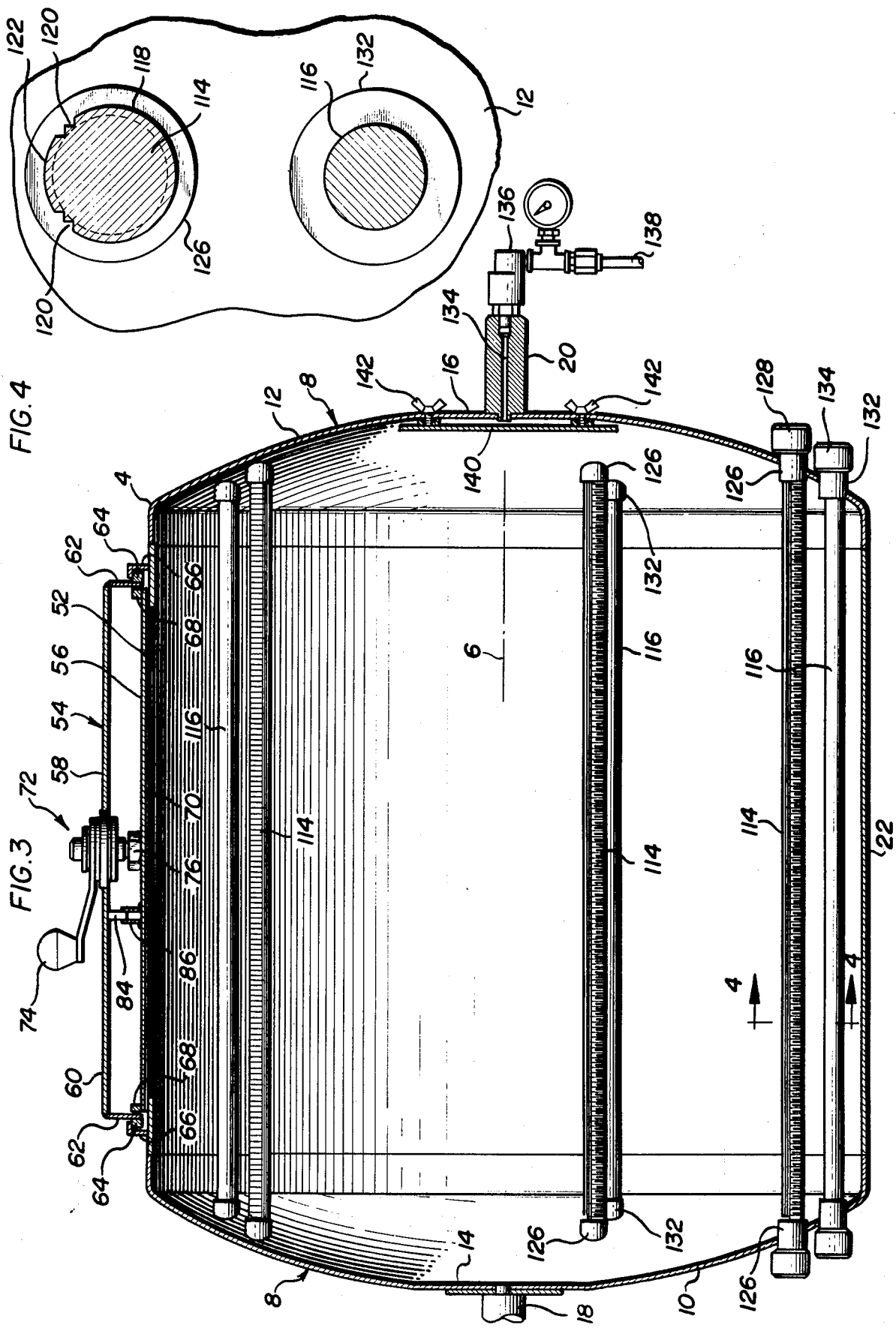

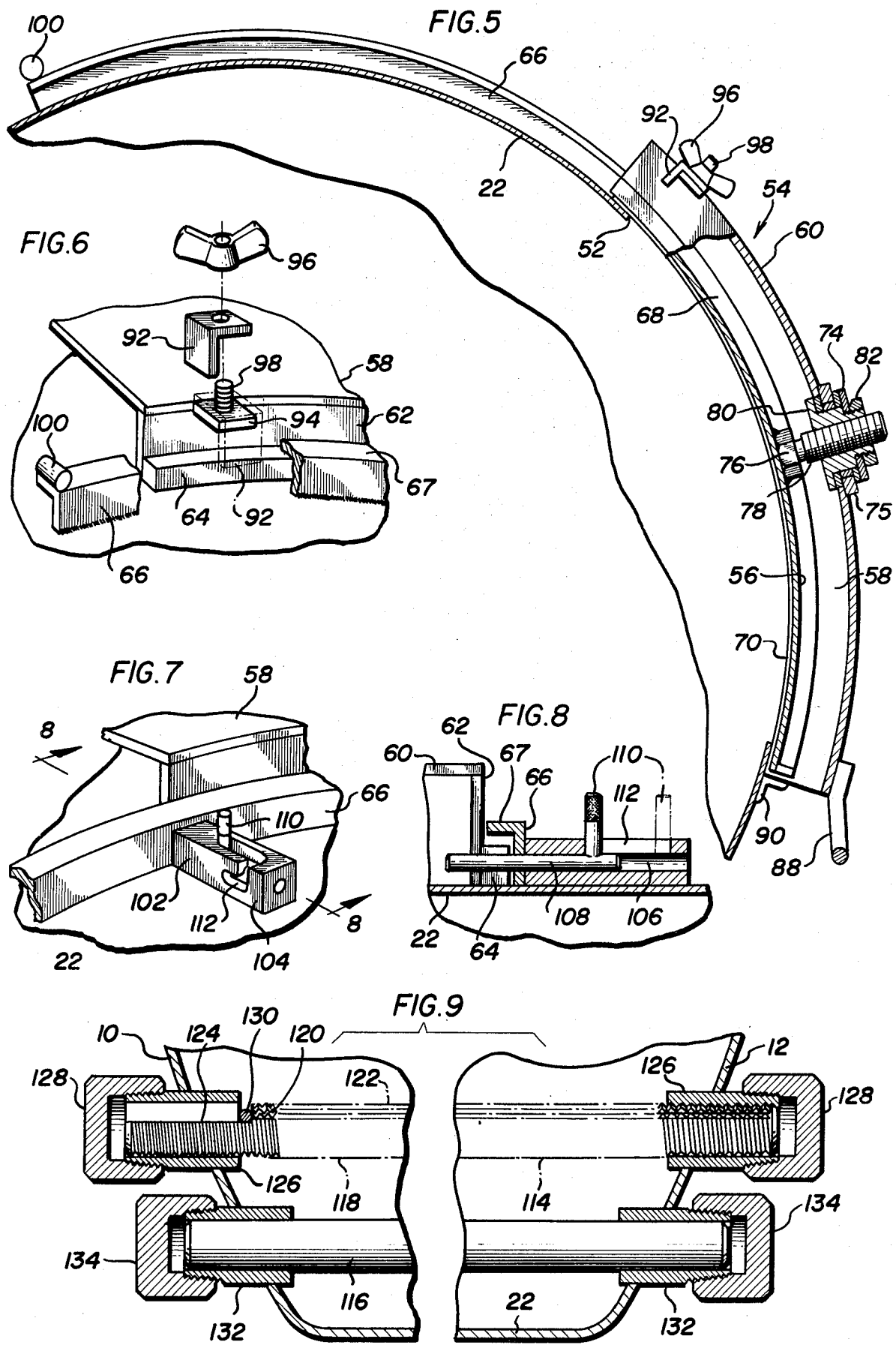

MEAT TUMBLER

BACKGROUND OF THE INVENTION

This invention relates to improvements in processes and apparatus for treating meat prior to further processing such as steam cooking or smoke curing.

In the commercial processing of various kinds of meat that is sold in a cooked or in a cured condition, the meat is sometimes conditioned during the processing in order to bring to the surface myosin protein. This substance is advantageously drawn to the surface of the meat prior to cooking because myosin protein tends to bind the contacting surfaces of the meat product together when the product is pressed and cooked in a mold or in a plastic bag. For example, in processing boneless hams the meat is folded or rolled and pressed prior to the cooking operation. Unless the product is properly adhered at the folds it tends to become unraveled. On the other hand, if the meat is properly adhered it is much easier to slice, particularly if the slices are to be made comparatively thin. A further advantage in bringing myosin protein to the surface lies in the fact that there is an even color distribution in the meat after it is cooked. Furthermore, the presence of myosin protein at the surface of the meat tends to increase its yield or retention of moisture.

Prior machines have tended to beat the surface of the meat resulting in a destruction of the fibers and a poor appearance. Such a treatment is not satisfactory for the processing of boneless products such as hams and the like, because destruction of the fibers tends to tear the meat into small sections. This is contrary to good practice, which is to produce boneless hams as integral pieces of meat.

Other machines have tended to massage the meat very slowly in order to bring the myosin protein to the surface. In one known process the meat is gently massaged for a period of about 20 hours. However, because of the excessive length of time the processing cost of the meat is raised considerably. It is also questionable whether or not enough myosin is brought to the surface of the meat to provide perfect bonding.

OBJECTS AND SUMMARY OF THE INVENTION

An object of this invention is to provide a new process and apparatus for treating meat in which the meat is tumbled for a relatively short period of time, of the order of about ten minutes to thirty minutes, and wherein the tumbling operates in conjunction with serrated or toothed rods within the tumbler so as to form a mass of small cuts in the meat, thereby to expose more myosin protein to the surface of the meat. The process is applicable to various cuts of meat. It is believed that the combination of tumbling and cutting the surface of the meat by the toothed rods provides improved color distribution, proper dispersion of pickling agents throughout the meat tissue, and the exposure of myosin to the surface of the meat.

In accordance with the foregoing objects the process of the present invention comprises introducing pieces of meat into a drum that contains groups of teeth disposed about the inside of the drum, rotating the drum about a substantially horizontal axis to cause the meat to be tumbled by repeatedly raising the meat above said horizontal axis, and then dropping the meat downwardly onto the teeth while maintaining substantially the integrity of the respective pieces of meat, and by said tumbling forming a mass of small cuts in the surfaces of the pieces of meat, which results in exposing myosin protein to the surfaces of the pieces of meat.

In accordance with the apparatus of the present invention there is a drum rotatable about a substantially horizontal axis, the drum having an opening therein and a door for closing the opening to permit loading and unloading of the pieces of meat into and from the drum. Means in the drum provide a multiplicity of teeth exposed to the inside of the drum, and there are means for raising pieces of meat in the drum above said axis of rotation and then allowing the meat to drop downwardly onto the teeth as the drum is rotated about said axis. The teeth are of such size and configuration as to form a mass of small cuts in the surfaces of the pieces of the meat. It is believed that the cuts increase the exposed surface of meat and cause the myosin protein to be exposed to the surface of the meat.

In accordance with an embodiment of this invention the teeth are formed on a group of rods which extend parallel to the axis of rotation and are adjacent to the periphery of the drum on its inside. The rods are circumferentially spaced so that the meat that is being tumbled impinges upon the rods for cutting by the teeth thereof. The teeth on the rod are formed by providing a roll thread on the rod and then milling the rod along its length at a number of places. The discrete teeth form small scratches or slits in the surface of the meat of the order of 1/16 of an inch or less. The inside of the drum also has a group of smooth or non-tooth rods adjacent the toothed rods to aid in the tumbling operation. Both groups of rods, i.e. the toothed and smooth rods can be readily removed through an end wall of the drum for cleaning or the like.

In accordance with a further object of this invention the drum is provided with a novel watertight door that closes the opening. The door has inner and outer door members and a door-operating mechanism, including a rotating crank, for sealing and unsealing the door across the opening. In the open position the inner and outer door members expose the opening to permit loading or unloading of the drum. The inner and outer door member can be shifted as a unit along rails or guides to close the opening whereupon the door operating member can be operated to first shift the outer door outwardly to a predetermined position and upon further operation shift the inner door member inwardly against the drum to form a fluid tight seal therewith.

In some types of processing operation it is desirable to have a vacuum within the drum. Accordingly, a vacuum pump is used to draw continuously the air from within the drum while the latter is rotating. In order to avoid obstruction of the vacuum line within the drum the invention comprises a novel baffle plate construction which inhibits product within the drum from obstructing the vacuum opening.

In a typical apparatus, by way of example but not of limitation, the drum may have a diameter of about 36" and a nominal length of approximately 42" so as to hold approximately 750 pounds of meat product and pickling solution (if used) when the drum is a little less than one-half filled. Typically the meat product is a deboned ham, although beef, poultry and other meat products may be processed in accordance with the present invention. The tumbler is rotated of the order of 12 to 24 rpm and preferably approximately 20 rpm for a period of about 10 minutes to 30 minutes. The precise processing time and speed of rotation will vary with certain conditions such as the amount of meat within the drum, the surface texture of the meat, and possibly other factors as well. The preferred period appears to be about 20 minutes. This provides not only enought scratches but also enables the pickling solution to be dispersed more fully throughout the meat. A significance of the invention is that the processing time is of the order of a fraction of an hour rather than 20 hours. The tooth rods create a texturized adhesive character to the tumbled product so that after the meat is cooked it can be thin sliced without falling apart. Furthermore, the integrity of the meat is maintained as there is no tearing or mashing of the meat since the tumbling is rather gentle and the tooth rods tend only to score the surface and do not break down the fibers deeply within the meat. Typically the depth of the teeth is approximately 1/16 of an inch with the result that the cuts or scratches in the meat do not exceed that value and in many cases are somewhat less.

BRIEF DESCRIPTION OF THE FIGURES.

FIG. 3 is a fragmentary sectional view, on an enlarged scale, taken substantially along line 3—3 of FIG. 2 but with the drum being empty for purposes of clarity;

FIG. 4 is a fragmentary sectional view, on an enlarged scale, taken along line 4—4 of FIG. 3;

FIG. 5 is a fragmentary sectional view, on an enlarged scale, taken along line 5—5 of FIG. 1 with the drum empty;

FIG. 6 is a fragmentary partially exploded perspective view of a part of the door assembly and the associated door-release mechanism which forms part of the present invention;

FIG. 7 is a fragmentary perspective view of a portion of a door assembly and the associated safety lock-open mechanism which also forms part of the present invention;

FIG. 8 is a fragmentary sectional view taken approximately along line 8—8 of FIG. 7; and FIG. 9 is a fragmentary sectional view on an enlarged scale, taken substantially along line 9—9 of FIG. 2 and with the plane of the section extending throughout the full length of the machine.

DETAILED DESCRIPTION

Figure 1:
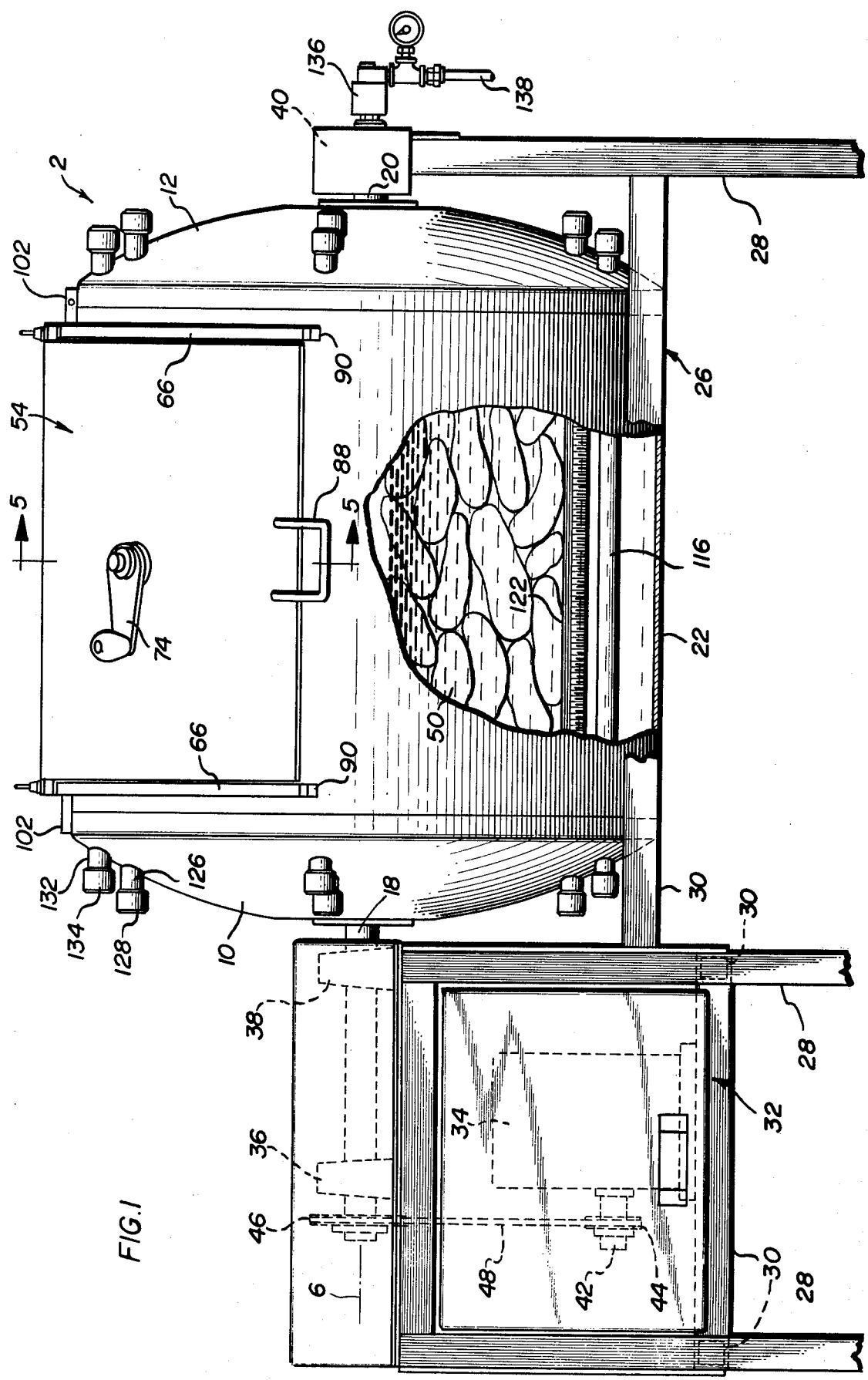
FIG. 1 is a front elevational view, partially broken away, of a machine in accordance with this invention and showing meat being processed.
Figure 2:
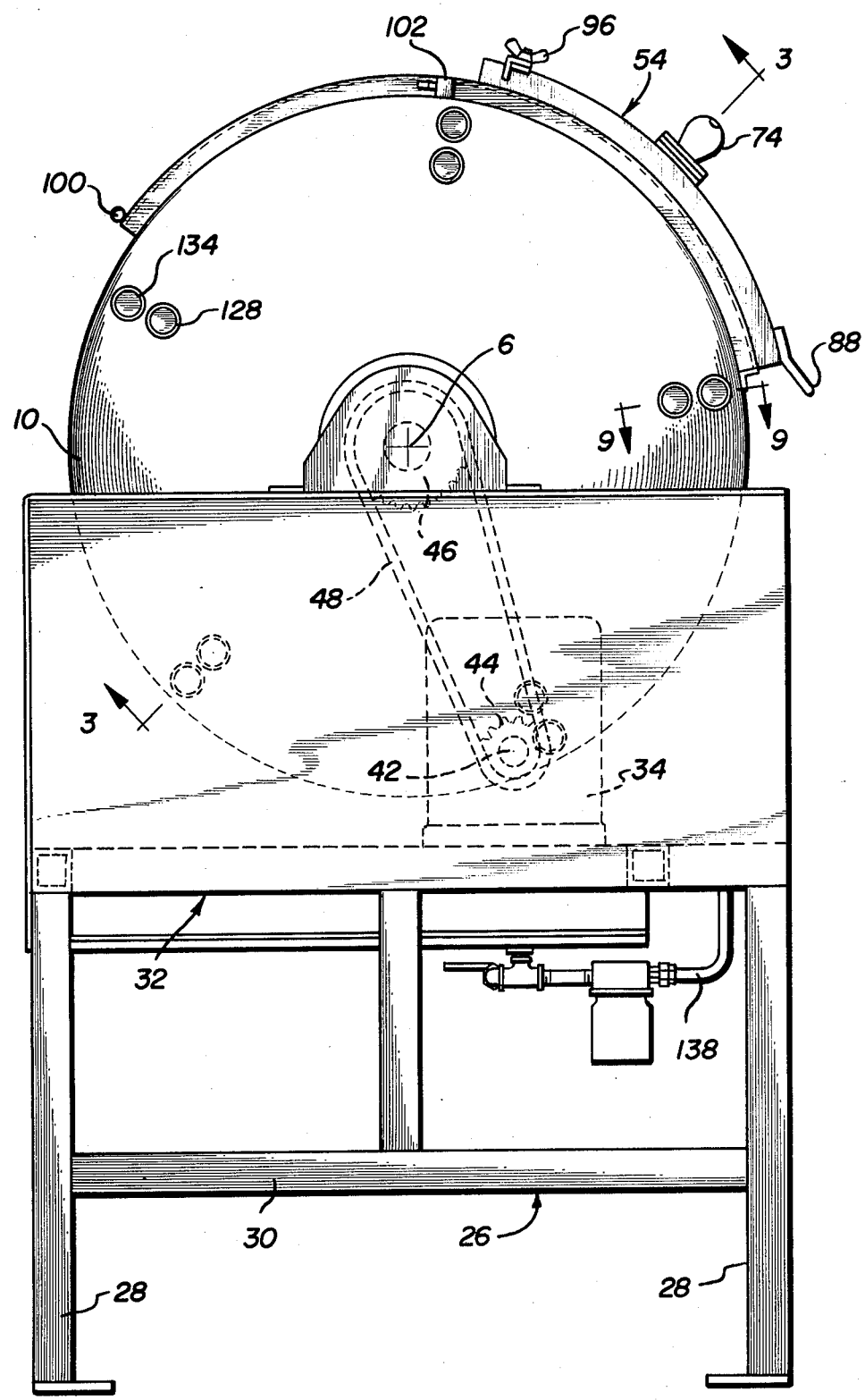
FIG. 2 is a side elevational view of the machine of FIG. 1 as viewd from the left hand side of FIG. 1.

Referring now in more detail to the drawing there is shown a meat processing apparatus comprising a tumbling machine 2 having a tumbling drum 4 that is rotatable about a horizontal axis 6. The drum includes opposed drum ends 8,8 of generally hollow somewhat frusto-conical configuration and which define drum sidewalls 10,12. These sidewalls 10,12 include central reinforced regions 14,16 at which opposed drum shafts 18,20 are secured. These drum shafts 18,20 project away from their respective central regions 14,16 and are coaxial. The shafts 18,20 are also centered on the horizontal axis 6. The drum 4 further includes a cylindrical sidewall 22 that extends between the endwalls 10,12 and with the sidewall 22 also surrounding and being substantially centered on the axis 6.

The drum 4 is mounted on a suitable upstanding frame 26 that includes a series of uprights 28 together with a number of interconnecting generally horizontal cross members 30. The frame 26 also includes at one end a subframe 32 of generally rectilinear configuration for supporting an electric drive motor and transmission unit 34. The frame 26 and its subframe 32 also support horizontally aligned bearings 36,38,40 which are centered on the axis 6. As best seen in FIG. 1, the drum shaft 18 is journaled in the bearings 36,38 while the opposite drum shaft 20 is journaled in the bearing 40.

The motor transmission unit 34 is conventional and is therefore not described in detail. Suffice it to say, however, that the motor speed is reduced by the transmission portion of the assembly sufficient to drive the drum at a relatively slow speed, for instance of the order of 12 to 24 rpm. The output shaft 42 of the unit 34 is provided with a sprocket 44 which is aligned with a sprocket 46 on the drum shaft 18. There is a drive chain 48 around the sprockets 44,46, thereby to provide a positive drive between the shafts 18,42. The drive system thus described may be shrouded for reasons of safety. The motor transmission unit 34 may be controlled in a known manner as by devices such as a variable motor speed control, alarm signal to indicate the end of a tumbling cycle, forward and reverse switching etc.

For loading and unloading pieces of meat 50 (FIG. 1) into and out of the drum the cylindrical side wall 22 has an opening 52. This opening 52 may be opened and closed by an arcuately shiftable watertight door 54 that includes inner and outer arcuate door members 56,58. The outer door member 58 includes a panel 60 that is radially spaced from the opening 52 and the inner door member 56. At the side margins of the panel 60 are depending skirts 62,62, the lower ends of which carry arcuate bearing or supporting rods 64,64. As best seen in FIGS. 3,5 and 8 these rods 64,64 are adapted to slide within angle-shaped rails or guides 66 that are on opposite sides of the opening 52.

The inner door member 56 is provided with ribs 68 at its margins to stiffen the inner door member at its periphery. The inner door member 56 has a coating of gasket or sealing material 70 on its inwardly presented surface for purposes of forming a fluid tight seal across the opening 52. This material 70 may be suitable silicone rubber sheet that is bonded to the inner door surface. It will also be noted from FIG. 3 that the sidewall 22 is somewhat thickened where the angle shaped guides 66 are mounted, which is also where the lateral margins of the inner door member 56 are located when the door is closed. Thus, when the door 54 is closed, as will be presently more fully described, the periphery of the inner door member 56 will seat against the sidewall 22 in surroudi ng relation to the opening 52 and form a gas and liquid tight seal thereacross, as shown in FIGS. 3 and 5.

The inner and outer door members 56,58 are coupled to each other through a door operating means 72 that includes a crank handle 74 by which the seal of the inner door member 56 across the opening 52 may be made or broken. More particularly, the inner door member 56 has, on its radially outer surface and centrally thereof, a stud 76 welded thereto and with its threaded end 78 projecting radially loosely through a reinforcing ring 75 fixed in the outer door member panel 60. Referring now more particularly to FIG. 5, the crank 74 is jointly rotatable with a hub 80 which also projects through the ring 75 and is threaded onto the threaded part 78 of the stud 76. The crank 74 and hub 80 may be keyed together in any suitable manner. The crank is held assembled with the hub 80 by a nut 82 on the threaded part 78. The hub 80 is rotatable in the ring 75 by the bearing arrangement shown, that includes spacers and bushings of anti-friction material within and on opposite sides of the ring 75. Mounted on the panel 60 in spaced relationship to the mechanism 72 (see FIG. 3) is a radially inwardly projecting pin 84 which slidably fits into a sleeve 86 fixed on the inner door member 56. This pin and sleeve arrangement 84,86 aids in locating the inner and outer door member 56,58 in proper alignment, especially upon reassembly after removal from the drum and cleaning.

The outer door member has a handle 88 at its lead end by which the two door members 56,58 can be moved together across or away from the opening 52. The two door members making up the door 54 are guided in their movement along the guides 66,66. To seal the door 54 across the opening 52 the two door members are brought into overlying relation with respect to the opening 52. This is the position shown in the drawing, and best seen in FIGS. 3 and 5. In such position the front or lead end of the outer door member 58 abuts short stop angles 90 adjacent to each guide 66. The crank 74 is then rotated causing the hub 80 to rotate. As the hub 80 rotates the outer door member 58 is moved radially outwardly relative to the inner door member 56 until the bearing rods 64,64 engage and stop against the axial flange portions 67 of the angle shape guides 66. When this condition occurs, further rotation of the crank 74 in the same direction causes the inner door member 56 to move radially inwardly relative to the outer door member 58 until the gasket material 70 seals tightly against the drum sidewall 22 in the region surrouding the opening 52. See FIGS. 3 and 5. Reverse rotation of the crank 74 loosens the door assembly 54 for subsequent movement to its open position.

The door 54 also has angle-shaped stop brackets 92,92. These are secured to laterally projecting stub plates 94,94 on the outer door member 58. As best seen in FIGS. 5 and 6, the stub plate 94 for each bracket 92 is located at the trailing end of door, namely the end that is opposite to the handle 88. Normally each stop bracket 92 is positioned as shown in full lines in FIGS. 5 and 6 and is held in that position by a wing nut 96. This wing nut 96 is threaded onto a stud 98 which is secured to the plate 94. When the handle 88 is grasped the door may be easily opened by moving it to the left (swung counterclockwise as viewed in FIG. 5) until the stop brackets 92,92 engage stop pins 100 welded on the guides 66 at the trailing ends thereof. The arcuate extent of the door opening 52 is about 60°; hence the door 54 is of a somewhat greater arcuate extent. In any event, the arcuate extent or angle of arc that the door 54 shifts counterclockwise (FIG. 5) should be sufficient to uncover completely the opening 52.

For cleaning and maintenance purposes it is desirable to be able to remove the entire door assembly 54. For this purpose the stop brackets 92,92 can be repositioned as indicated in broken lines in FIG. 6. Thus, each wing nut 96 can be loosened and the stop bracket 92 associated therewith can be turned 90° as shown by the broken lines in FIG. 6. In that position the depending flange portion of the bracket 92 lies laterally or outside of the guide 66 and as a result the stop bracket 92 clears the stop pin 100 whereby the door assembly 54 can be arcuately shifted as far as is necessary to be removed as a unit from the guides 66.

When the door 54 is in its fully open position, a suitable arrangement is provided as a safety feature for holding the door open. Such arrangement preferably consists of mechanisms 102,102 on the guides 66,66 adjacent to the opening 52, as best seen in FIGS. 1, 2, 7 and 8. Each mechanism 102 comprises a rectangular block 104 having a bore 106 for slidably receiving a bolt 108 with a handle 110. The bolt handle 110 rides in a generally U-shaped slot 112 having one leg longer than the other as seen in FIG. 7, and with each leg being in a side of the block 104. When the bolt handle 110 is in the longer leg of the slot 112, as shown in full lines in FIGS. 7 and 8, the pin 108 extends in front of the outer door side skirt 62, thereby holding the door assembly 54 in its open position. When the handle is shifted to the dotted line position shown in FIG. 8 the bolt 108 is retracted from in front of the adjacent skirt 62, allowing the door assembly 54 to be shifted to its closed position. The bolt handle 110 may be moved to the shorter leg of the slot 112 for storage in the door-unlocked condition.

As earlier stated, an important provision of this invention lies in a structure that provides groups of teeth for forming small scratches, slits or cuts in the meat pieces 50 as they are being tumbled in the chamber of the drum 4. The groups of teeth may be in the form of a first group of rods which are toothed rods 114. The rods 114 run parallel to the axis 6 and extend between the end walls 10,12. It will be noted that these rods 114 are circumferentially spaced and are adjacent to the periphery of the interior of the drum sidewall 22. By way of example but not a limitation, it has been found that with a drum of about 36 inches in internal diameter, five rods 114, equally spaced circumferentially, are satisfactory for purposes of this invention. The rods 114 may be one inch in nominal diameter. This group of rods 114 are of like construction and are radially inwardly of a second group of rods 116 which are plain or smooth. The plain rods 116 have smooth external surfaces and are also disposed parallel to the axis 6 and extend between the opposed end walls 10,12. It will be noted that the rods 114, 116 are disposed in pairs, each pair consisting of one toothed rod 114 and one plain rod 116. Generally speaking, the center lines of the rods 114 are disposed on a circle and the same is true of the center lines of the rods 116 although the latter circle is of large diameter. Furthermore, the center lines of any pair of rods 114,116 define a plane which includes the axis 6.

Turning now again to the rods 114, these are formed along the length with a roll thread 118 with the thread 118 having a sharply defined crest. For example, eight threads per inch may be rolled. The roll threading techniques used for this purpose are known and need not be described. As best seen in FIGS. 4 and 9, the roll thread 118 is longitudinally milled for substantially the full length of the rod 114 to provide slots 120. These slots 120 together with the thread 118 define the teeth 122 that are presented to the interior of the drum. The teeth 122 are desirably formed in the foregoing manner since roll threading techniques are known, and it is simply a matter of milling or otherwise machining the slots 120 so that the teeth 122 may be formed. At one end section 124, each rod 114 is cut down for a portion of its length, for purposes presently more fully appearing.

Each rod 114 is mounted in a pair of aligned bushings 126,126 that are respectively rigidly mounted in the end walls 10,12. The bushings 126,126 are closed off and sealed exteriorly of the drum by end caps 128,128 which are internally threaded for threading onto the externally threaded ends of the bushings 126,126. Across each bushing 126 that is in the endwall 10 there is a straight cross pin 130 (FIG. 9) located at the inside end of the bushing 126 and against which the rod 114 abuts at the flat section 124. This cross pin 130 extends chord-wise across the circular opening in the bushing 126. Thus, the cross pin 130 and the flat section 124 prevents the rod 114 from rotating when positioned within the bushings 126. The arrangement also orients the teeth 122 correctly when the rod 114 is in the drum. In this regard it should be regarded that the teeth 122 are presented generally toward the axis 6. The teeth 122 extend approximately one quandrant of the rod 114 and the plane defined by the center line of a rod 114 and the axis 6 approximately bisects this quandrant.

While the rods 114 are prevented from rotating in their respective bushings 126, the plain rods 116 are freely rotatable in their respective aligned bushings 132,132 which are also fixed in the end walls 10,12. These bushings 132,132 are provided with threaded removable end caps 134,134 which form a seal with the bushing 132 and serve essentially the same purpose as do the end caps 128,128, previously described. By removal of the end caps 128,134, it is possible to withdraw the rods 114,116 individually from the drum 4. The plain rods 116 can be removed through either end walls 10,12, but by reason of the cross pin 130 each tooth rod 114 can only be removed through the end wall 12.

The drum chamber defined by the side wall 22 and opposed end walls 10,12 is partially filled with meat product 50, that may include pickling solution. The drum chamber is preferably filled to about one-half of its diameter or less. As the drum 4 rotates the pieces of meat 50 are tumbled by being repeatedly raised above the axis 6 and then dropped downwardly onto the teeth 122 of the rods 114. The tooth rods 114 and the plain rods 116 both aid in the tumbling operation. However, the plain rods 116 are primarily used for tumbling and further serve to prevent pieces of meat from becoming lodged in the space between each rod 114 and the sidewall 22 of the drum. The fact that the rods 116 are freely rotatable appears to aid in preventing pieces of meat from becoming lodged between the pairs of rods 114,116.

The depth of the teeth 122 will be determined by the depth of the thread 118 that is rolled onto the rod 114. It has been found that a thread depth of about 1/16th of an inch will produce cuts in the meat that provide satisfactory results. The small cuts in the meat appear to be enough to expose the myosin protein and taken in combination with the tumbling provides improved color distribution and dispersion of pickling solution, all without significant destruction of the meat fibers. A processing time of approximately ten to thirty minutes, and preferably about 20 minutes has been found satisfactory in those instances in which the invention has been used.

In some cases the meat product is processed under a vacuum. For this purpose the shaft 20 (see FIG. 3) is provided with a central bore 134 to which is connected a conventional union 136 of the type that provides a seal with the rotating shaft 20. The fixed or non-rotatable portion of the union 136 is connected to a vacuum line 138. Vacuum that is applied at the line 138 will, therefore, be applied through the bore 134 to the chamber of the drum 4. In order to prevent the meat product from obstructing the bore 134 a vertical baffle plate 140 is provided on the inside of the drum adjacent to but spaced from the end wall 12 and near the central region 16. The baffle plate 140 has threaded studs as shown which project through the drum wall 12, and the baffle plate is held in place by wing nuts 142 on the studs. Gaskets, O-rings or other sealing means may be used to provide a seal where the studs for the plate 140 project through the end wall 12. The plate 140 acts as a barrier that obstructs pieces of meat and prevents them from being drawn across the entrance to the bore 134.

The invention is claimed as follows:

1. Meat tumbling apparatus comprising a drum rotatable about a substantially horizontal axis, said drum having an opening therein, a door for closing said opening to permit loading and unloading of pieces of meat into and from the drum, means on the drum providing a multiplicity of teeth exposed to the inside of the drum, and means for raising pieces of meat in the drum above said axis and then allowing the meat to drop downwardly onto said teeth as the drum is rotated about said axis; said teeth being of such size and configuration as to form a mass of small cuts in the surfaces of the pieces of meat sufficient to increase significantly the exposure of myosin protein at the surfaces of the meat, said means for providing said multiplicity of teeth and said means for raising the pieces of meat comprising members that are radially outwardly of said axis and located to provide circumferentially spaced groups of teeth and meat raising elements, the teeth of each group being presented generally toward said axis, the circumferential disposition of the groups of teeth and of said meat raising elements extending over a full circle of rotation and with the spacing from group to group being less than 180° and such that pieces of meat are raised and dropped downwardly in the order of one-half a revolution of drum rotation, and in which the members comprise rods that extend generally parallel to said axis.

2. Meat tumbling apparatus according to claim 1 in which said means for raising the pieces of meat includes additional rods adjacent to and radially outwardly of the tooth-containing rods.

3. Meat tumbling apparatus according to claim 2 in which said drum has a sidewall surrounding said axis of rotation and opposed end walls at opposite ends of said sidewall, said end walls having means supporting said tooth-containing rods and said additional rods for individual removal from the drum through an end wall.

4. Meat tumbling apparatus according to claim 1 in which said drum opening is on said sidewall and said door comprises inner and outer arcuate door members slidable in unison on said drum, and door-operating means for shifting said outer door member radially outwardly of said axis to a predetermined position and upon further operation of said door-operating means shifting said inner door member radially inwardly into sealing relation over said opening.

5. Meat processing apparatus comprising a drum having a cylindrical sidewall and opposed end walls defining a chamber, for receiving meat, means for rotating said drum, said sidewall having an opening, a door across said opening, a first group of rods in said chamber extending between said end walls adjacent to said sidewall, a second group of rods in said chamber also extending between said end walls and radially outwardly of said first group of rods, the rods of the groups being disposed in pairs, one from each group, and with the pairs being circumferentially spaced apart, the rods of the first group having teeth presented generally toward the central axis of said cylindrical sidewall for making small cuts in meat that is within the drum as the drum is rotated.

6. Meat processing apparatus according to claim 5 in which said teeth are formed by roll threads on said rods and cuts across the threads longitudinally of the rods.

7. Meat treating apparatus according to claim 5 in which said first group of rods are fixed against rotation and the second group of rods are rotatable about their longitudinal axes.

8. Meat processing apparatus according to claim 5 including shafts coaxial with said central axis and projecting from said end walls exteriorly thereof for supporting said drum in bearings, one of said shafts having an axial bore communicating with the interior of the drum and adapted for connection to a vacuum line, and a baffle plate adjacent to the endwall in the region of said bore for preventing product within the drum from closing off the bore.

9. Meat tumbling apparatus comprising a drum having an opening therein and a wall portion offset from said opening, a door for closing said opening, means for making a fluid tight seal between the door and the opening, power driven means for rotating said drum, and members within said drum and having teeth presented toward the interior of the drum for forming a multiplicity of small cuts in pieces of meat tumbled within the drum, and means for mounting said members on the drum to permit removal of said members through said wall portion of the drum.

* * * * *